(12) United States Patent
Zhao et al.

(10) Patent No.: US 9,746,719 B2
(45) Date of Patent: Aug. 29, 2017

(54) LIQUID CRYSTAL DROPPING DEVICE AND LIQUID CRYSTAL DROPPING METHOD

(71) Applicants: BOE Technology Group Co., Ltd., Beijing (CN); Chengdu BOE Optoelectronics Technology Co., Ltd., Chengdu (CN)

(72) Inventors: Wei Zhao, Beijing (CN); Bo Shi, Beijing (CN); Junhwan Lim, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 352 days.

(21) Appl. No.: 14/354,325

(22) PCT Filed: Dec. 16, 2013

(86) PCT No.: PCT/CN2013/089501
§ 371 (c)(1),
(2) Date: Apr. 26, 2014

(87) PCT Pub. No.: WO2015/010423
PCT Pub. Date: Jan. 29, 2015

(65) Prior Publication Data
US 2016/0313584 A1    Oct. 27, 2016

(30) Foreign Application Priority Data

Jul. 22, 2013   (CN) .......................... 2013 1 0308406

(51) Int. Cl.
*G02F 1/13*    (2006.01)
*G02F 1/1341*  (2006.01)
*G05D 23/19*   (2006.01)

(52) U.S. Cl.
CPC .......... *G02F 1/1341* (2013.01); *G02F 1/1303* (2013.01); *G05D 23/19* (2013.01); *G05D 23/1934* (2013.01); *G02F 2001/13415* (2013.01)

(58) Field of Classification Search
None
See application file for complete search history.

(56) References Cited

U.S. PATENT DOCUMENTS 5,791,782 A  *  8/1998  Wooten .................. G01K 1/143
                                                       374/163
2006/0283385 A1    12/2006  Iwata et al.
(Continued)

FOREIGN PATENT DOCUMENTS

CN    1444081 A     9/2003
CN    1872548 A    12/2006
(Continued)

OTHER PUBLICATIONS

Notification of the First Office Action issued by the Chinese Patent Office for corresponding application CN 201310308406.1 mailed May 5, 2015 includes English translation.
(Continued)

*Primary Examiner* — Charles Capozzi
(74) *Attorney, Agent, or Firm* — Haug Partners LLP

(57) ABSTRACT

The present invention provides a liquid crystal dropping device and method, relates to technical field of manufacturing liquid crystal display devices, and may solve the problem of defective display resulting from dropping of liquid crystal on a substrate in the existing technology. The liquid crystal dropping device of the present invention comprises a platform for bearing substrates and a temperature adjusting unit for adjusting temperature of at least partial area of the substrate.

5 Claims, 3 Drawing Sheets

(56) References Cited

U.S. PATENT DOCUMENTS

2008/0296311 A1* 12/2008 Read .................. H05K 13/0469
                                                                               221/1
2014/0054282 A1* 2/2014 Wang .................. H05B 1/0288
                                                                               219/521
2014/0199785 A1* 7/2014 Ranish .............. H01L 21/67115
                                                                               438/5

FOREIGN PATENT DOCUMENTS

| CN | 201429756 | * | 3/2010 | |
|----|-----------|---|--------|---|
| CN | 201429756 | Y | 3/2010 | |
| CN | 102207653 | A | 10/2011 | |
| CN | 102621748 | A | 8/2012 | |
| CN | 202796877 | * | 3/2013 | |
| CN | 202796877 | U | 3/2013 | |
| CN | WO 2013155913 A1 | * | 10/2013 | ........... H05B 1/0288 |
| CN | 103383508 | A | 11/2013 | |
| JP | 2002-361159 | A | 12/2002 | |
| JP | 2004-344704 | A | 12/2004 | |
| JP | 2005-121736 | A | 5/2005 | |
| JP | 2005-128415 | A | 5/2005 | |

OTHER PUBLICATIONS

International Search Report and Written Opinion issued by Chinese Patent Office for international application PCT/CN2013/089501.
English translation of the Written Opinion issued by the Chinese Patent Office for international application PCT/CN2013/089501.

* cited by examiner

LIQUID CRYSTAL DROPPING DEVICE AND LIQUID CRYSTAL DROPPING METHOD

This application is a 371 of PCT/CN2013/089501 filed on Dec. 16, 2013, which claims priority benefits from Chinese Patent Application Number 201310308406.1 filed Jul. 22, 2013, the disclosure of which is incorporated herein by reference.

FIELD OF THE INVENTION

The present invention relates to the technical field of manufacturing a liquid crystal display panel, and particularly to a device and a method for controlling liquid crystal dropping in the process of manufacturing a liquid crystal display panel.

BACKGROUND OF THE INVENTION

A liquid crystal panel, as an important component of a liquid crystal display, includes a color film substrate, an array substrate and a liquid crystal layer therebetween, and a sealant is coated around the liquid crystal panel. The process of cell-forming operation of a liquid crystal display panel generally includes the following steps: first, crystal liquid is injected to a color film substrate or an array substrate using one drop filling (ODF for short) method, and then the color film substrate and the array substrate are packaged through aligning and snapping them with each other in a vacuum to form a cell (cell aligning). Specifically, first, a motherboard comprising multiple regions in each of which a substrate (e.g. array substrate) is provided is placed on a platform provided with bearing pillars for bearing substrates, and each bearing pillar corresponds to one liquid crystal dropping spot on the substrate. The liquid crystal in a liquid crystal dropping nozzle is dripped to a liquid crystal dropping spot on the substrate in a droplet form by using the one drop filling method. The motherboard is taken down after finishing dripping liquid crystal onto the substrate, and the sealant is coated around the other substrate (e.g. color film substrate). Then, the substrate with liquid crystal dripped thereon is placed below, while the other substrate coated with the sealant is turned upside down and placed above. Finally, in a vacuum environment, the two substrates are aligned and snapped with each other and packaged into a whole, which is subsequently cut into separate liquid crystal substrates according to respective display regions, thus basically forming crystal panels.

There exist some problems in the existing one drop filling method. For example, impact force will be applied to the alignment film on the substrate when liquid crystal is dripped onto the substrate by using the one drop filling method, which may result in display non-uniformity phenomenon (Drop Mura) in the area of the substrate with liquid crystal dripped thereon. In addition, as for the dropping spots in the middle of the substrate, liquid crystal in the dropping spots cannot spread out quickly due to the large size of the liquid crystal panel, as a result of which, some undesirable phenomena such as bubbles occur in liquid crystal. An existing improved way is to increase the number of liquid crystal dropping spots and decrease the liquid crystal amount of each dropping. However, this may only achieve limited improvement, in addition, the precision is hard to control, and the time required for injecting liquid crystal is increased. Furthermore, in the rim of the liquid crystal panel, it is possible that the sealant has not yet entirely coagulated, and therefore, ion impurities in the sealant may go into liquid crystal when the liquid crystal spreads to a position where the sealant is located after cell aligning, resulting in contamination in the liquid crystal. Accordingly, the normal display of a display device formed by such liquid crystal panel will be badly impacted, for example, deficient image or deficiency in the edge may occur in a display screen. The existing improved method, on one hand, requires increasing the distance between the liquid crystal dropping spots and the sealant as much as possible, and on the other hand, requires solidifying the sealant as quickly as possible. Such method works for large-size liquid crystal panels, however, for small-size liquid crystal panels, there is great possibility that the dripped liquid crystal may quickly contact with the sealant and then be contaminated due to the limited distance between the liquid crystal dropping spots and the sealant.

SUMMARY OF THE INVENTION

To overcome the above defects existing in the prior art technology, the present invention provides an improved liquid crystal dropping device and method, and the core of the technical solutions thereof is that the temperature of at least partial area of a substrate is adjusted optimally by providing a temperature adjusting unit, for example, the temperatures of different positions are raised and/or lowered based on different positions on the substrate and temperature information correlated with the positions. Thus uniform, rapid and controllable dropping and diffusion of liquid crystal can be achieved, and the problems of non-uniform diffusion velocities of dripped liquid crystal at different positions of the substrate and contamination in liquid crystal by ion impurities in the sealant at the rim of the substrate existing in the prior art technology are relieved and even eliminated.

One technical solution of the present invention provides a liquid crystal dropping device, comprising a platform for bearing substrates; and a temperature adjusting unit for adjusting temperature of at least partial area of the substrate.

According to the above technical solution of the present invention, wherein the temperature adjusting unit comprises a sensing-temperature adjusting module and a control module. Specifically, the sensing-temperature adjusting module comprises a sensing component for sensing and outputting position-temperature correlation information of a part of the substrate corresponding to a position where the sensing-temperature adjusting module is located on the platform; and a temperature adjusting component for adjusting temperature of the position where the sensing-temperature adjusting module is located, and the control module comprises a storage component for pre-storing a set of reference values of substrate position-temperature correlation information; and a control component for controlling the temperature adjusting component to adjust the temperature of the position where the sensing-temperature adjusting module is located, based on a result of a comparison between the pre-stored reference values of substrate position-temperature correlation information and the position-temperature correlation information of the part of the substrate output by the sensing component, to change a temperature of the part of the substrate corresponding to the position where the sensing-temperature adjusting module is located on the platform.

According to another technical solution of the present invention, a plurality of the sensing-temperature adjusting modules are embedded under an upper surface of the platform in arrays and controlled by one said control module.

According to still another technical solution of the present invention, the platform is provided with a plurality of bearing pillars for bearing the substrate, and a plurality of the sensing-temperature adjusting modules are respectively provided in each of the bearing pillars and controlled by one said control module.

Further, the bearing pillars are capable of moving along the surface of the platform to align with liquid crystal dropping spots on the substrate.

One technical solution of the present invention provides a liquid crystal dropping method, comprising the step of adjusting temperature of at least partial area of a substrate by using a temperature adjusting unit of any one of the liquid crystal dropping devices described in the above technical solutions during dropping of liquid crystal.

According to the method in the above technical solution of the present invention, wherein the step of adjusting temperature of at least partial area of a substrate comprises the steps of sensing and outputting position-temperature correlation information of a part of the substrate corresponding to a position being sensed on a platform; comparing a pre-stored set of reference values of substrate position-temperature correlation information with the position-temperature correlation information of the part of the substrate corresponding to the position being sensed; and adjusting temperature of the position being sensed based on the comparison result to change temperature of the part of the substrate corresponding to the position being sensed on the platform.

With a liquid crystal dropping device and method in the above technical solutions of the present invention, since the temperatures of difference positions may be raised and/or lowered based on different positions on the substrate and temperature information correlated with the positions, uniform, rapid and controllable dropping and diffusion of liquid crystal can be achieved, and the problems that diffusion velocities of dripped liquid crystal at different positions of the substrate are non-uniform, and ion impurities in the sealant at the rim of the substrate contaminate liquid crystal existing in the prior art technology can be relieved and even eliminated.

BRIEF DESCRIPTION OF THE DRAWINGS

Embodiments of the present invention will be described with reference to accompanying drawings, and the description is only used to facilitate understanding of the technical solutions of the present invention, rather than to limit the present invention, wherein.

The reference numbers are: 1, liquid crystal dropping nozzle; 2, liquid crystal dropping spot; 3, substrate; 4, platform; 5 bearing pillar; 6, control module; 601 storage component; 602 control component; 7, sealant; 8, sensing-temperature adjusting module; 801, sensing component; 802, temperature adjusting component.

DETAILED DESCRIPTION OF THE EMBODIMENTS

Embodiment 1

Figure 1:
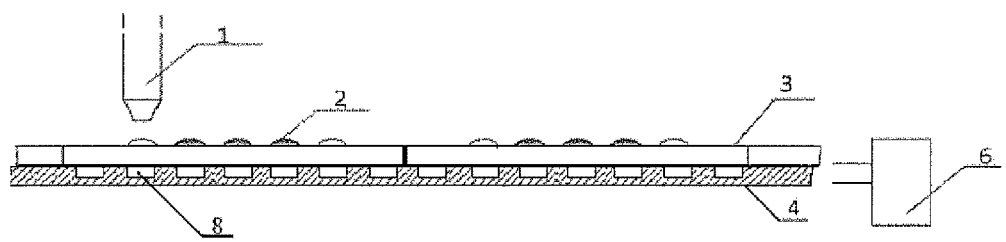
FIG. 1 is a diagram illustrating a structure of a liquid crystal dropping device according to Embodiment 1 of the present invention.
Figure 4:
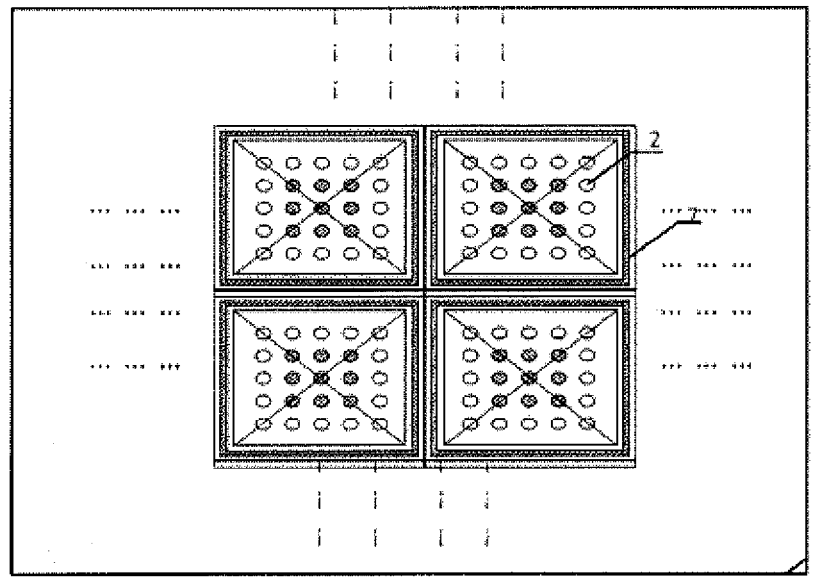
FIG. 4 is a top view of an upper substrate of a liquid crystal dropping device according to Embodiment 2 of the present invention.

As illustrated in FIG. 1, the present embodiment provides a liquid crystal dropping device, comprising: a platform 4 for bearing a substrate 3 and a plurality of sensing-temperature adjusting modules 8 for adjusting the temperatures of at least partial regions of the substrate 3. The sensing-temperature adjusting modules 8 constitute an array and are embedded under the upper surface of the platform 4 without protruding therefrom. A control module 6 and the sensing-temperature adjusting modules 8 perform cooperative operation of data/instructions via a bus so as to form a temperature adjusting unit. Generally, a plurality of substrates 3 are included in a large motherboard, i.e. the liquid crystal dropping device of the present embodiment generally processes a plurality of substrates 3 at one time. For example, as illustrated in FIG. 4, four substrates 3 are processed at the same time and a sealant 7 defines the boundary of each substrate 3. Apparently, for different positions in the substrate 3, different temperatures are required so as to meet different requirements for liquid crystal spreading. For example, when liquid crystal dropping nozzle 1 drips liquid crystal into a liquid crystal dropping spot 2 located in the central of the substrate 3, increasing the temperature at the liquid crystal dropping spot 2 properly facilitates steady spreading of the liquid crystal. However, when the liquid crystal dropping nozzle 1 drips liquid crystal into a position at the rim of the substrate 3, that is, a liquid crystal dropping spot 2 close to the sealant 7, decreasing the temperature at the liquid crystal dropping spot 2 properly may avoid contamination caused by contact between the liquid crystal and the sealant 7.

Definite quality control of production line and accumulation process of data enables those skilled in the art to fully master parameters of optimal control condition required for manufacturing a liquid crystal panel of prescribed specification (especially under a condition that panel material, liquid crystal material, sealant material and production equipment to be used are fixed). In the present invention, the temperature values of respective positions on the entire area of the liquid crystal panel required for achieving optimal product quality for the liquid crystal panel of certain specification are addressed and stored in a storage component 601 in a control module 6, and such set of temperature values for achieving optimal product quality is called reference values, which is apparently a set of position-temperature correlation information. In other words, quality control may be directly performed by retrieving and mapping the set of reference values when the liquid crystal panel of such specification is fabricated in a production line.

Figure 5A:
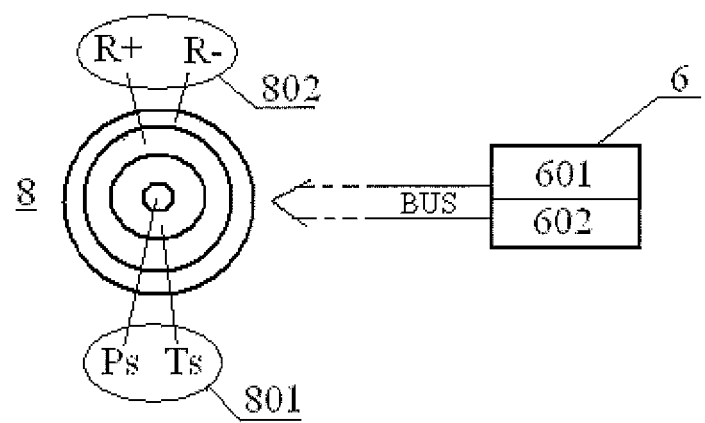
FIG. 5a is a schematic diagram illustrating principle of temperature control of one sensed position on a substrate by a temperature adjusting unit employed in the technical solution of the present invention.

FIG. 5a is a schematic diagram illustrating temperature control of a sensed position in the substrate 3 by a temperature adjusting unit employed in the technical solution of the present invention. The temperature control of one liquid crystal dropping spot 2 by the temperature adjusting unit of the present invention is described with reference to FIG. 5a.

FIG. 5a illustrates the relationship between the sensing-temperature adjusting modules 8 and the control module 6 which constitute the temperature adjusting unit of the present invention together. The sensing-temperature adjusting module 8 comprises a sensing component 801 and a temperature adjusting component 802. The sensing component 801 and the temperature adjusting component 802 are integrated as the sensing-temperature adjusting module 8. Specifically, the sensing component 801 comprises a position sensor Ps for sensing a position in the processed liquid crystal panel and a temperature sensor Ts for sensing a temperature of the position. The temperature adjusting component 802 comprises a heating device R+ and a cooling device R−.

When the position sensor Ps and the temperature sensor Ts of the sensing component 801 transmit the sensed position data and temperature data at the position to the control module 6, the control component 602 of the control module 6 obtains the optimal temperature data of the corresponding position from the set of position-temperature correlation information reference values stored in the storage component 601 and compares the two temperature values. The control component 602 controls the cooling device R− to operate such that the temperature of the position is lowered to the stored optimal reference value of the corresponding position if the sensed current temperature value is higher than the optimal reference value. Otherwise, the control component 602 controls the heating device R+ to operate such that the temperature of the position is increased to the stored optimal reference value of the corresponding position if the sensed current temperature value is lower than the optimal reference value.

For example, the position sensor Ps may be an optical sensor sensing light transmission amount, which may explicitly determine whether the position being sensed is located in the rim of the processed liquid crystal panel (e.g. through the opacity of the sealant 7) or in the middle of the processed liquid crystal panel. The temperature sensor Ts may be a contact type sensitive temperature sensor, which may provide temperature data of the position where it is located promptly. The heating device R+ may be a resistance wire with positive resistance characteristics or a heating plate, which can provide heat so as to increase the temperature of the position where it is located quickly when powered on. The cooling device R− may be a device with negative resistance characteristics or a negative galvanic couple, which can absorb heat so as to decrease the temperature of the position where it is located quickly when powered on. It should be understood by those skilled in the art that sensors and heating/cooling components in other forms may also be used to achieve the technical effect of the present invention, for example, separate liquid-feeding pipelines may be employed to provide hot liquid and cold liquid, respectively, so as to achieve the purpose of increasing and/or decreasing the temperature of a particular position.

As a matter of fact, the function of the control module 6 (comprising the control component 602 and the storage component 601) in the present embodiment is implemented by a central control processor of the liquid crystal panel production line system, that is, the temperature control on at least partial region of the substrate of the processed liquid crystal panel according to the present invention is a part of the whole line processing control program.

Figure 5B:
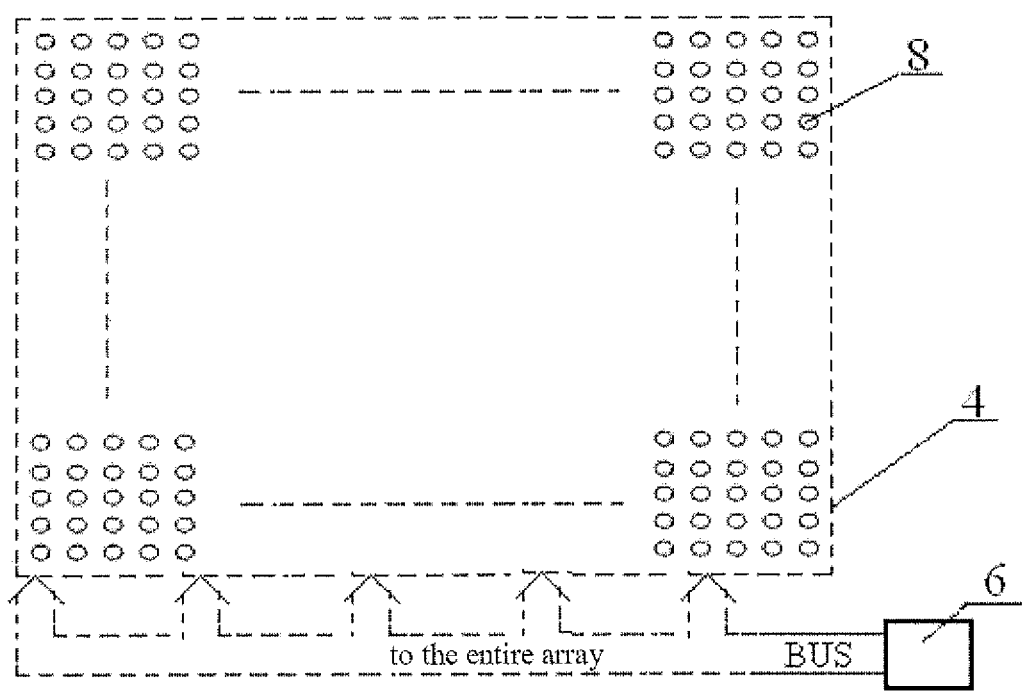
FIG. 5b is a schematic diagram illustrating principle of temperature control of all sensed positions on the substrate by a temperature adjusting unit employed in the technical solution of the present invention.

FIG. 5b is a schematic diagram illustrating the principle of temperature control of all sensed positions on the substrate by a temperature adjusting unit employed in the technical solution of the present invention. FIG. 5b illustrates a specific connection of the liquid crystal dropping device provided with the temperature adjusting unit according to the present invention shown in FIG. 1 more clearly. It can be seen clearly from FIG. 5b that multiple sensing-temperature adjusting modules 8 are embedded in the platform in arrays, and all of them are controlled by the control module 6. The array of sensing-temperature adjusting modules 8 "effectively covers" the entire area of the platform 4 completely. The phrase "effectively cover" indicates that the combination of areas that can be sensed by respective sensing-temperature adjusting modules 8 in the array of sensing-temperature adjusting modules 8 fully cover the entire area of the platform 4. In the present embodiment, the liquid crystal dropping spots of the liquid crystal dropping device align with respective sensing-temperature adjusting modules 8 in the array of sensing-temperature adjusting modules 8, so that the most effective temperature control of the dripped liquid crystal droplet can be maintained.

For example, as illustrated in FIG. 4, four liquid crystal panel substrates 3 with the same area are processed on the whole area of the platform 4 simultaneously, the position sensors Ps in the array of sensing-temperature adjusting modules 8 corresponding to the periphery of the sealant 7 sense, obtain and output corresponding position data information, and corresponding temperature sensors Ts output the temperature information data of the corresponding positions. The position sensors Ps and the temperature sensors Ts surrounded by the sealant 7 and close to the central position of the processed substrate 3 also output the position data information and temperature data information of the positions where they are located. The above sensed position data information and temperature data information is output to the control module 6.

As described above, since the position sensors Ps are light sensors, the position data information corresponding to the positions in the periphery of the sealant 7 will be significantly different from that corresponding to the positions close to the center of the processed substrate 3. Based on such difference, the control component 602 may determine the type of the processed substrate 3 and the addresses of all arrays of sensing-temperature adjusting modules 8 corresponding to the processed substrate 3. The control component 602 retrieves a set of pre-stored reference values of substrate position-temperature correlation information from the storage component 601 as optimal quality control values, which are mapped to correspond to the addresses of all arrays of sensing-temperature adjusting modules 8 of the processed substrate 3, and correspondingly compares the pre-stored reference values of substrate position-temperature correlation information with the position-temperature correlation information of the processed portions of the substrate 3 output by the sensing component 801 one by one. Based on the result of the comparison, the control component 602 outputs control signals to drive the heating devices R+ and/or cooling devices R− in the temperature adjusting components 802 to perform heating or cooling operations at specific positions. Thus temperatures at the portions of the substrate 3 where specific sensing-temperature adjusting modules 8 are located on the platform are changed.

Generally, in the pre-stored reference values of substrate position-temperature correlation information, that is, the data parameters for achieving optimal quality control of the substrate 3, data corresponding to different positions of the substrate 3 are set differently. Therefore, with the temperature adjusting unit of the present invention, point-to-point control of the corresponding processed substrate 3 may be achieved, and thus the temperature of at least partial region of the substrate 3 may be adjusted.

For example, the temperature values sensed by the temperature sensors Ts corresponding to peripheral position of the sealant 7 may be higher than the optimal quality control value mapped to the position from the pre-stored set of reference values of substrate position-temperature correlation information. At this time, the control component 602 drives the cooling devices R− in the temperature adjusting components 802 corresponding to said peripheral position of the sealant 7 to decrease the temperatures of the positions where the temperature adjusting components 802 are located, and thus the temperature of the partial position of the substrate 3 corresponding to said peripheral position of the sealant 7 on the platform is decreased. The advantages of such processing lie in that the ion impurity in the sealant 7 can be prevented from contacting and contaminating the liquid crystal, and the solidification of the sealant 7 can be promoted since the temperatures of the liquid crystal dropping spots 2 corresponding to the peripheral position of the sealant 7 are decreased properly.

As another example, the temperature values sensed by the temperature sensors Ts corresponding to central position of the processed substrate 3 may be lower than the optimal quality control value mapped to said position from the pre-stored set of reference values of substrate position-temperature correlation information. At this time, the control component 602 drives the heating devices R+ in the temperature adjusting components 802 corresponding to said central position to raise the temperatures of the positions where the temperature adjusting components 802 are located, and thus the temperatures of the partial positions of the substrate 3 corresponding to said central position on the platform is increased. The advantages of such processing lie in that the diffusion velocity and the diffusion uniformity of liquid crystal are improved since the temperatures of the liquid crystal dropping spots 2 corresponding to the central position of the processed substrate 3 are increased properly.

The point-to-point control achieved in the unit of each array of sensing-temperature adjusting module 8 corresponding to the processed substrate 3 realizes local temperature control adjustment of substrate 3 corresponding to the liquid crystal dropping spots 2. Areas corresponding to respective liquid crystal dropping spots 2 are controlled concurrently in time but independently from each other without mutual interference. Therefore, high-quality one dropping filling operation of liquid crystal for the processed substrate 3 can be ensured.

The device provided by the present embodiment may also perform temperature control with particular purpose on the processed substrate 3. For example, "cooling" operation may be performed separately on the whole peripheral area where the sealant 7 is located so as to facilitate its solidification and prevent it from contaminating liquid crystal; "Manual control" is performed on the device, e.g., special treatment is performed on a particular position so as to achieve a special effect or overcome incidental deficiencies of the substrate 3 or deficiencies peculiar to the substrate 3; and in order to adapt to liquid crystal dropping processing method with non-uniform liquid crystal dropping amount, temperature regulating setting may be made by taking liquid crystal dropping amount as a parameter.

Embodiment 2

Figure 2:
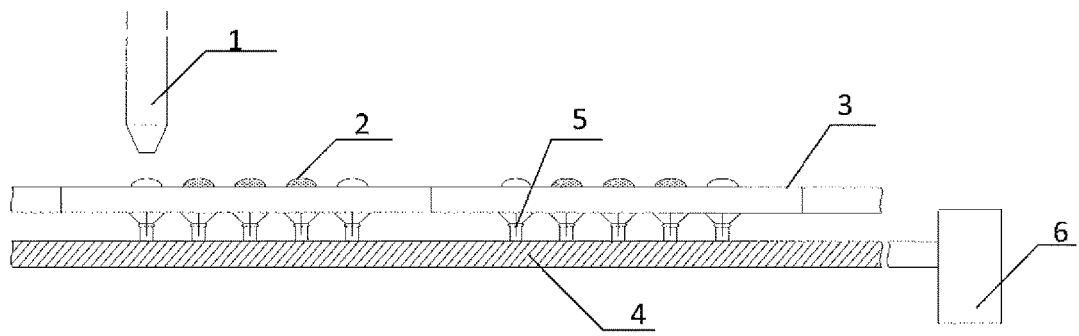
FIG. 2 is a diagram illustrating a structure of a liquid crystal dropping device according to Embodiment 2 of the present invention.

FIG. 2 is a diagram illustrating a structure of a liquid crystal dropping device according to Embodiment 2 of the present invention. As illustrated in FIG. 2, the liquid crystal dropping device provided by the present embodiment has a structure which is roughly the same as that of Embodiment 1, except that the platform is provided with multiple bearing pillars 5 and sensing-temperature adjusting modules 8 (not shown in FIG. 2) are provided in the bearing pillars 5 corresponding to partial areas of the substrate 3 on the platform 4. In this case, the formation of the array of sensing-temperature adjusting modules 8 is realized depending on the array of bearing pillars 5 provided on the platform 4. Herein, generally, the bearing pillars 5 keep aligned with the liquid crystal dropping spots 2 on the substrate 3, that is, the alignment between respective sensing-temperature adjusting modules 8 in the array of the sensing-temperature adjusting modules 8 of the present invention and the liquid crystal dropping spots 2 is maintained, thus achieving most effective temperature control on dripped liquid crystal droplet.

The sensing-temperature adjusting modules 8 provided in all of the bearing pillars 5 may be controlled individually by the control module 6. Furthermore, correspondence between positions of the bearing pillars 5 and the liquid crystal dropping spots 2 on the substrate 3 may also be adjusted under the control of the control module 6. In other words, if one liquid crystal dropping spot 2 on the substrate 3 corresponds to one separate sensing-temperature adjusting module 8, relative position relationship between the liquid crystal dropping spot 2 and the specific sensing-temperature adjusting module 8 may be changed by adjusting the position of the bearing pillar 5 on the platform 4.

The feature that the positions of bearing pillars 5 on the platform 4 are adjustable in the present embodiment not only enables the present embodiment to realize all the functions of embodiment 1, but also gives the present invention more application freedom and new functions/effects.

First of all, in general cases, the bearing pillars 5 on the platform 4 may be adjusted to align with the liquid crystal dropping spots 2 as accurately as possible, thus achieving most effective temperature control over dripped liquid crystal droplet.

Secondly, the heating/cooling effect that a certain sensing-temperature adjusting module 8 plays on the liquid crystal on a specific liquid crystal dropping spot 2 may be decreased by adjusting the position relationship between the bearing pillar 5 and the liquid crystal dropping spot 2 to be aligned therewith, so as to obtain a special technical effect or adapt to a particular one dropping filling processing method of liquid crystal, such as a method of dropping non-equivalent amount of liquid crystal.

Various methods may be used to move the bearing pillars 5 along the surface of the platform 4 on the platform 4. For example, the platform 4 may be equipped with a plurality of sliding rails therein, and the bearing pillars 5 are positioned on the sliding rails and may move along the sliding rails under the control of the control module 6. It should be understood that, in the case that the position of each bearing pillar 5 is controlled by the control module 6, the furthest moving distance of a bearing pillar 5 will not exceed the distance between two adjacent bearing pillars 5 in the array of bearing pillars 5 on the platform 4. Such case may be envisaged that several (e.g. 3 to 5) bearing pillars 5 are drawn closer to each other under the control of the control module 6 to meet requirements for special processing purpose.

Figure 3:
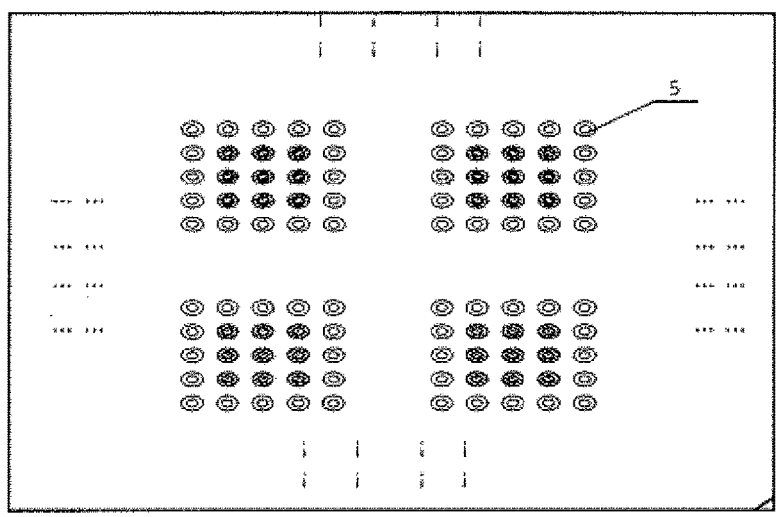
FIG. 3 is a top view of a liquid crystal dropping device according to Embodiment 2 of the present invention.

FIG. 3 is a top view of a liquid crystal dropping device according to Embodiment 2 of the present invention. FIG. 4 is a top view of an upper substrate of a liquid crystal dropping device according to Embodiment 2 of the present invention.

FIG. 3 illustrates the distribution of bearing pillars 5 on the platform 4 equipped with a plurality of sliding rails, and multiple bearing pillars 5 are placed on the sliding rails to form an array and may move along the sliding rails under the control of the control module 6. In this case, the positions of the bearing pillars 5 may be adjusted to align with the positions of the liquid crystal spots 2 on the substrate 3, that is, the positions of the sensing-temperature adjusting modules 8 may be adjusted to align with the positions of the liquid crystal spots 2 on the substrate 3.

FIG. 4 illustrates the distribution of liquid crystal dropping spots 2 on the substrate 3. It can be shown that the motherboard on the platform 4 will be processed into four substrates 3 with the same area. The four to-be-processed substrates 3 are defined by the sealant 7 clearly. The liquid crystal dropping spots 2 on the substrate 3 are in one-to-one correspondence with the bearing pillars 5 on the platform 4, that is, the sensing-temperature adjusting modules 8 are in one-to-one correspondence with the liquid crystal dropping spots 2 on the substrate 3, so that temperature control can be performed so as to control the diffusion state of liquid crystal droplets once liquid crystal is dripped. The positions of the bearing pillars 5 may be changed to adapt to the positions of the substrates 3 on the platform 4, thus achieving various processing effects.

From the above descriptions of Embodiment 1 and Embodiment 2, the liquid crystal dropping method of the present invention may be summarized as follows. During the dropping of liquid crystal, the temperature of at least partial area of the substrate is adjusted by using the sensing-temperature adjusting module 8 so as to control the diffusion of the dripped liquid crystal droplets and guarantee the quality of the processed substrate 3.

Specifically, firstly, the position-temperature correlation information of the part of the substrate 3 corresponding to the position being sensed on the platform 4 is sensed and output by the sensing-temperature adjusting module 8. Next, the control module 6 compares the pre-stored set of reference values of substrate position-temperature correlation information with the position-temperature correlation information of the part of the substrate corresponding to the position being sensed. Based on the result of the comparison, the temperature of the position being sensed is adjusted to change the temperature of the part of the substrate corresponding to the position being sensed on the platform.

With the liquid crystal dropping devices and methods in the above technical solutions of the present invention, since the temperatures of difference positions may be raised and/or lowered based on different positions on the substrate and temperature information correlated with the positions, uniform, rapid and controllable dropping and diffusion of liquid crystal is thus achieved, and the problems of non-uniform diffusion velocities of dripped liquid crystal at different positions of the substrate, occurrence of bubbles and contamination of liquid crystal by ion impurities in the sealant at the rim of the substrate existing in the prior art are relieved and even eliminated.

It should be understood that above implementations are merely exemplary implementations used to explain the principle of the present invention, however, the present invention are not limited thereto. Various modifications and improvements may be made by those skilled in the art without departing from the spirit and substance of the present invention, and such modifications and improvements are also deemed as the protection scope of the present invention.

The invention claimed is:

1. A liquid crystal dropping device, comprising:
a platform for bearing substrates; and
a temperature adjusting unit for adjusting a temperature of at least a partial area of a substrate, the temperature adjusting unit comprising:
    a sensing-temperature adjusting module, comprising:
        a sensing component for sensing and outputting position-temperature correlation information of a part of the substrate corresponding to a position where the sensing-temperature adjusting module is located on the platform; and
        a heating and/or cooling device for adjusting temperature of the position where the sensing-temperature adjusting module is located; and
    a control module, comprising:
        a storage component for pre-storing a set of reference values of substrate position-temperature correlation information; and
        a control component for controlling the heating and/or cooling device to adjust a temperature of the position where the sensing-temperature adjusting module is located, based on a result of a comparison between the pre-stored reference values of substrate position-temperature correlation information and the position-temperature correlation information of the part of the substrate output by the sensing component, so as to change the temperature of the part of the substrate corresponding to the position where the sensing-temperature adjusting module is located on the platform
wherein the temperature adjusting unit is configured to adjust a temperature of an edge area of the substrate to be lower than a temperature of a central area of the substrate; and
wherein a plurality of the sensing-temperature adjusting modules are embedded under an upper surface of the platform in arrays and controlled by one said control module.

2. The liquid crystal dropping device according to claim 1, wherein the platform is provided with a plurality of bearing pillars for bearing the substrate, and the plurality of sensing-temperature adjusting modules are provided in respective bearing pillars and controlled by one said control module.

3. The liquid crystal dropping device according to claim 2, wherein the bearing pillars are capable of moving along the surface of the platform to align with liquid crystal dropping spots on the substrate.

4. A liquid crystal dropping method, comprising:
in the process of dropping liquid crystal, adjusting a temperature of at least a partial area of a substrate by using a temperature adjusting unit of a liquid crystal dropping device, the liquid crystal dropping device comprising:
a platform for bearing substrates; and
the temperature adjusting unit for adjusting the temperature of the at least partial area of the substrate, the temperature adjusting unit comprising:
    a sensing-temperature adjusting module, comprising:
        a sensing component for sensing and outputting position-temperature correlation information of a part of the substrate corresponding to a position where the sensing-temperature adjusting module is located on the platform; and a heating and/or cooling device for adjusting temperature of the position where the sensing-temperature adjusting module is located; and a control module, comprising:
a storage component for pre-storing a set of reference values of substrate position-temperature correlation information; and
a control component for controlling the heating and/or cooling device to adjust a temperature of the position where the sensing-temperature adjusting module is located, based on a result of a comparison between the pre-stored reference values of substrate position-temperature correlation information and the position-temperature correlation information of the part of the substrate output by the sensing component, so as to change the temperature of the part of the substrate corresponding to the position where the sensing-temperature adjusting module is located on the platform wherein the temperature adjusting unit is configured to adjust a temperature of an edge area of the substrate to be lower than a temperature of a central area of the substrate; and wherein a plurality of the sensing-temperature adjusting modules are embedded under an upper surface of the platform in arrays and controlled by one said control module.

5. The liquid crystal dropping method according to claim 4, wherein the step of adjusting the temperature of the at least partial area of the substrate comprises:

sensing and outputting position-temperature correlation information of a position being sensed of the substrate on the platform;

comparing a pre-stored set of reference values of substrate position-temperature correlation information with the position-temperature correlation information of the position being sensed of the substrate; and adjusting the temperature of the position being sensed based on the comparison result to change the temperature of the position being sensed of the substrate on the platform.

* * * * *